July 3, 1934.  G. W. YOST  1,964,778
VEHICLE
Filed Jan. 30, 1933  2 Sheets-Sheet 2

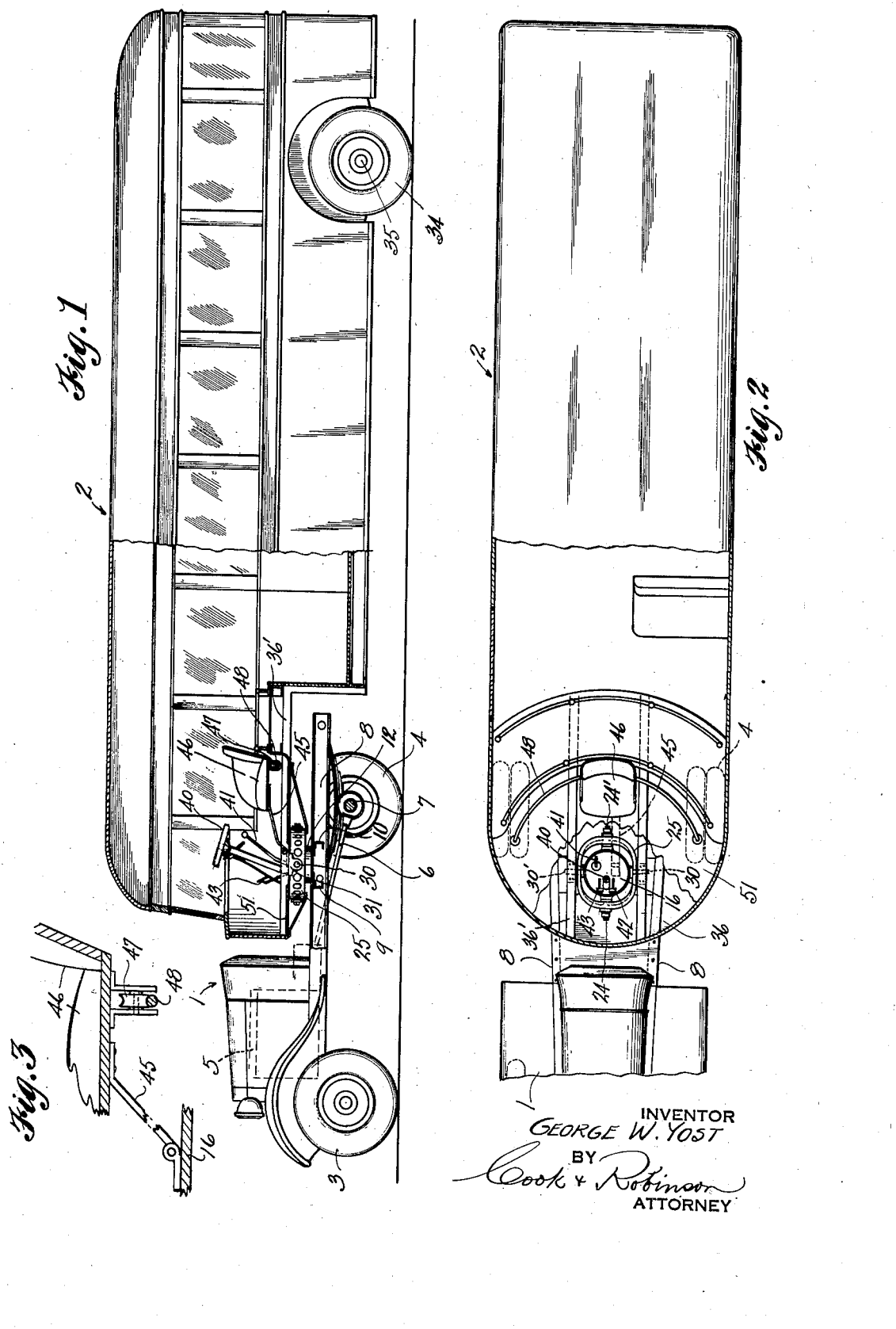

INVENTOR
GEORGE W. YOST
BY
Cook & Robinson
ATTORNEY

Patented July 3, 1934

1,964,778

UNITED STATES PATENT OFFICE 1,964,778

VEHICLE

George W. Yost, Edmonds, Wash.

Application January 30, 1933, Serial No. 654,203

5 Claims. (Cl. 280—33.1)

This invention relates to motor vehicles and it has reference more particularly to improvements in the construction of vehicles of the truck and trailer type whereby the truck and trailer are united in a unit vehicle, and wherein the body structure of the trailing vehicle has a pivotal supporting connection, at its forward end, with the truck and is so arranged as to include within it the vehicle operator and all of the operating control devices of the vehicle.

It is the principal object of this invention to provide a vehicle of the above character that is especially designed as a passenger vehicle, or bus, wherein the driver, or operator, is located within the bus body and directly in contact with the passengers; it being understood, however, that the vehicle is not to be limited to use of a passenger carrying vehicle.

It is also an object of the invention to provide a vehicle of the above stated type of construction which permits of an easy disconnection of the trailer body from the truck or power unit when it is desired to make a change of bodies.

Another object of this invention is to provide a construction embodying a novel fifth wheel connection between the truck or power unit and the trailing body, which permits of sharp turning.

It is also an object to support the driver's seat from the truck frame so that, in turning, his position remains constant relative to the truck and the control devices.

Another object of this invention is to provide a supporting trackway on which the driver's seat may travel during the turning operation.

Still other objects of the invention reside in the details of construction and combination of parts, especially with respect to the novel features of the pivotal connection between the trailer and truck, and the details of construction embodied in the forward end construction of the trailing vehicle.

In accomplishing these and other objects of the invention, I have provided the improved details of construction, the preferred forms of which are illustrated in the accompanying drawings, wherein—

Fig. 1 is a side view, partly in section, of a motor vehicle embodying the present invention, a part being broken away for better illustration.

Fig. 2 is a top, or plan view, of the same, partly in section for better illustration.

Fig. 3 is a sectional detail of a part of the seat and its supporting rail.

Figure 4:
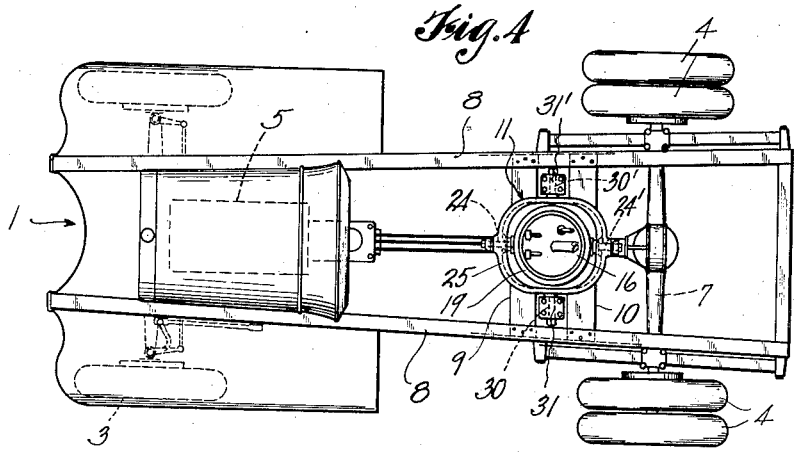
Fig. 4 is a plan view of the power unit or truck, showing the fifth wheel assembly as applied thereto.

Referring more in detail to the drawings—

The present vehicle, as illustrated best in Fig. 1, comprises a truck or power unit 1 and a trailer or passenger unit 2. The truck may comprise the usual automobile chassis, provided with front steering wheels 3, and rear driving wheels 4. The vehicle engine may be of the usual form and location as indicated at 5 in Fig. 1 and it is operatively connected by shaft 6 with the driving axle 7 of the wheels 4.

Figure 5:
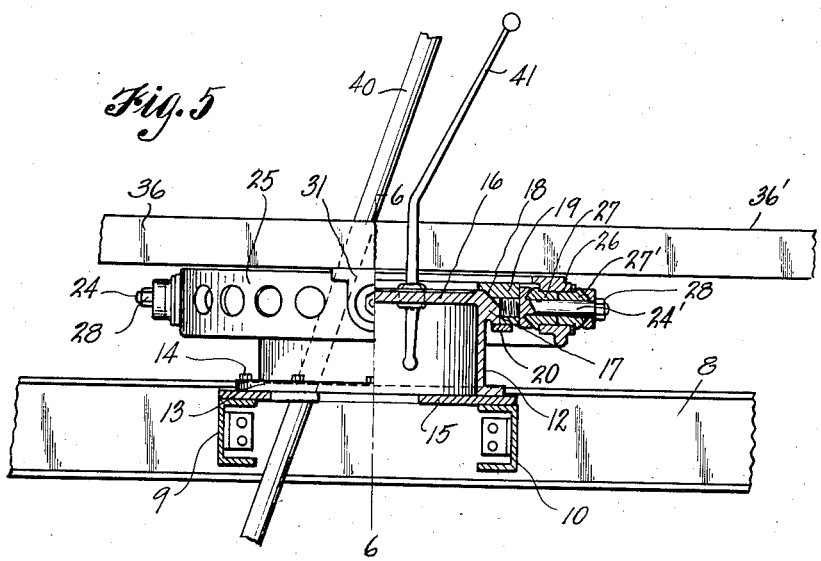
Fig. 5 is a side and partial sectional detail of the fifth wheel mechanism.

The chassis of the truck 1 comprises the longitudinal, opposite side beams 8—8 and these are joined just forwardly of the rear wheels, by a pair of parallel, spaced beams 9 and 10, which, as seen best in Fig. 5, mount the fifth wheel mechanism 11 which connects the forward end of the trailer with the truck.

This fifth wheel mechanism consists of a circular base 12 formed with a peripheral base flange 13 through which bolts 14 are extended to attach it rigidly to a plate 15 that overlies and is rigidly fastened to the cross beams 9—10. This base is in the form of a vertically disposed cylinder, closed at its top end by an integral, horizontal wall 16 and is formed with a peripheral flange 17, the outer top edge of which is beveled off as at 18. A ring 19 is disposed about this base and revolves freely on the beveled portion and it is held against possible upward displacement by a ring 20 that is fixed to its under side by bolts 21 to underlie the flange 17 of the base member.

Mounted at diametrically opposite points of the ring 19, in the longitudinal direction of the vehicle, are trunnions 24 and 24' on which a horizontally disposed yoke 25 of oval form is pivotally mounted. As seen best in Fig. 5, the yoke 25 has openings 26 therethrough for reception of the trunnions and in which bushings 27—27' are projected from opposite sides and these bushings are mounted on the trunnions, which are threaded at their inner ends into the ring 19. Nuts 28 are threaded onto the outer ends of the trunnions to retain the parts in assembled relation.

Figure 6:
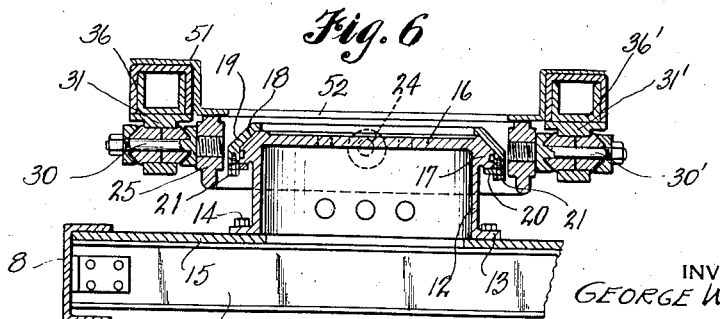
Fig. 6 is a cross section as on line 6—6 in Fig. 5.

At its opposite sides, the yoke is provided with laterally extending trunnions 30—30' as seen in Fig. 6, on which pads 31—31' are rotatably mounted for the support thereon of the forward end of the trailer body.

The trailer body, as seen best in Figs. 1 and 2, is designed for the carrying of passengers, and to accommodate it to this use it is set low to the ground. It may comprise the usual bus body construction, and be of any desired length. At its rear end this body is supported by wheels 34 on a cross axle 35. At its forward end the floor is stepped up to overlie the rear end of the truck chassis, and, at this end the frame structure of the bus includes two parallel floor supporting beams 36—36' which, as seen in Fig. 2, rest upon and are secured to the pads 31—31'.

With this arrangement, the trailer body is kept clear of the truck chassis, and by reason of the fifth wheel construction the truck may be turned at a right angle to the longitudinal direction of the trailer. Also, the trailer unit may pivot on the transversely alined trunnions 30—30' and the yoke may likewise pivot on the longitudinally alined trunnions 24—24'. Thus, a universal connection is provided which eliminates any possibility of twist or strain on the two units by reason of operation over uneven surfaces or sharp turning.

To provide for controlling operation of the vehicle from within the bus body, the various control devices, such as the steering column 40, gear shift lever 41 of the transmission mechanism, brake and clutch pedals 42 and 43 are extended upwardly through suitable openings provided therefor in the top plate 16 of the base 12. Also, there is a seat supporting arm 45 hingedly attached to the plate 16 and extended rearwardly, as seen in Fig. 1, where it is rigidly attached to the seat 46. This seat is provided with supporting rollers 47, as seen in Fig. 3, operable along an arcuate supporting rail 48 fixed to the floor of the trailer. Thus, the rail is curved about the axial line of the fifth wheel as a center, and when a turn is made, the seat simply travels along the rail to maintain its alinement with the truck and its proper relation with the various control devices. As is seen in Fig. 1, the floor 51 of the forward end of the trailer has an opening 52 coinciding with the base 15 for passage of the various control devices.

With the vehicle so constructed, it is possible to utilize, with slight alteration, any standard truck as a power unit, and it is possible to apply bus bodies of various capacities to this power unit. A change of bus bodies is made by simply disconnecting at the fifth wheel mechanism.

Having thus described my invention, what I claim as new therein and desire to secure by Letters Patent is—

1. A vehicle of the character described comprising a truck including propulsion and steering equipment, and a frame structure, a trailer body having wheel at its rear end and having its forward end overlying the truck frame, and a draft connection between the truck frame and trailer body comprising a base fixed to the truck frame, a ring fitted for rotation on the base about an upright axis, a yoke enclosing the ring and having pivotal supporting connection therewith at diametrically opposite sides of the ring, and trunnions on the yoke in an alinement at right angles to the alinement of the first pivots and pivotally supporting the overlying end of the trailer body, and controls for said propulsion and steering equipment mounted on said base within the ring and extended into the trailer body.

2. A vehicle of the character described comprising a truck including propulsion and steering equipment and a frame structure, and a trailer body having wheels at its rear end and disposed with its forward end overlying the said frame structure, a fifth wheel connection between the truck and trailed body comprising a circular base member rigidly fixed upon the truck frame, a horizontally disposed ring rotatably fitted on the base, and having diametrically alined trunnions extending therefrom toward front and rear ends of the truck, a yoke encircling the ring and pivotally attached to said trunnions, said yoke having trunnions extended from opposite sides thereof in alinement at right angles to the first trunnions and pads pivotally mounted on the yoke trunnions and mounting the overlying end of the trailer body and control means for the vehicle mounted on said circular base within the ring and extended into the trailer body and connected below the base to the propulsion and steering equipment.

3. A vehicle of the character described comprising a truck including propulsion and steering equipment, a trailer body having wheels at its rear end and, a fifth wheel connection between the truck and trailer body at its forward end comprising a hollow upright base member fixed rigidly to the truck, a ring fixed on said base for rotative movement axially thereon, a yoke enclosing the ring and pivotally attached thereto at diametrically opposite sides, trunnions on the yoke transversely alined relative to those on the ring, means supporting the trailer body from the latter trunnions, said trailer body having a floor opening registering with the said base member, and said truck having control devices mounted to extend into the trailer body through said hollow base and floor opening.

4. A vehicle as in claim 3 having an operator's seat within the truck body and having a supporting connection with said base through the floor opening.

5. A vehicle of the character described comprising a truck including propulsion and steering equipment and a frame structure, a trailer body having wheels at its rear end and disposed with its forward end overlying said frame structure, a fifth wheel construction between the truck and trailer body comprising a circular hollow base member rigidly fixed upon the truck frame, a ring rotatably fitted on the base, means pivotally connecting the trailer body at its forward end to the ring, control devices for the truck extended into the trailer body through the hollow base member, a seat within the trailer body having a supporting beam hingedly attached to the base member and a supporting rail, on which the seat may travel, mounted in the trailer body and curved arcuately about the axis of the fifth wheel mechanism.

GEORGE W. YOST.